United States Patent [19]

Files et al.

[11] Patent Number: 4,836,891
[45] Date of Patent: Jun. 6, 1989

[54] SELF-CONTAINED OIL WELL SALT WATER CONCENTRATION SYSTEM

[75] Inventors: James H. Files; Donald M. Harrel; John M. Montague; Thomas L. Stansbury Sr.; Carlton T. Sikes, all of Houston, Tex.

[73] Assignee: Evaporation, Inc., Houston, Tex.

[21] Appl. No.: 864,508

[22] Filed: May 19, 1986

[51] Int. Cl.⁴ .............................................. B01D 1/06
[52] U.S. Cl. ................................. 159/28.1; 159/44; 159/901; 159/DIG. 13; 122/33; 122/115; 166/267; 202/206; 202/237; 203/1; 203/3; 203/7; 203/39; 210/170; 210/223
[58] Field of Search ................ 159/28.1, 44, 27.1, 159/27.4, 901, DIG. 13, 1.1, 39, 40, DIG. 7, DIG. 26; 202/237, 206, 175, 176, 181; 203/1-3, 39, 7, 10, 11, 98, 99, DIG. 17; 210/223, 222, 170, 747, 695; 166/267; 122/31 R, 32, 33, 114, 115, 119, 126

[56] References Cited

U.S. PATENT DOCUMENTS

| | | | |
|---|---|---|---|
| 2,289,956 | 7/1942 | Gans et al. | 202/181 |
| 2,512,938 | 6/1950 | Henszey | 159/27.1 |
| 2,733,693 | 2/1956 | Johnsson | 159/901 |
| 2,798,543 | 7/1957 | Cook | 159/901 |
| 2,849,386 | 8/1958 | Gilmore | 202/153 |
| 2,910,119 | 12/1959 | Wennerberg | 159/901 |
| 2,939,830 | 6/1960 | Green et al. | 210/222 |
| 3,160,572 | 12/1964 | Rarden | 202/182 |
| 3,181,593 | 5/1965 | Lindley | 159/901 |
| 3,234,879 | 2/1966 | Brown | 166/267 |
| 3,290,153 | 12/1966 | Bayne et al. | 159/24.3 |
| 3,330,356 | 7/1967 | Hottman | 166/267 |
| 4,002,538 | 1/1977 | Pottharst | 159/27.3 |
| 4,259,160 | 3/1981 | McClure | 203/1 |
| 4,366,063 | 12/1982 | O'Connor | 210/170 |
| 4,479,546 | 10/1984 | Bresie et al. | 166/267 |
| 4,519,919 | 5/1985 | Whyte et al. | 210/222 |

Primary Examiner—Wilbur Bascomb
Attorney, Agent, or Firm—J. Peppers

[57] ABSTRACT

A method for concentrating salt water. Salt water is separated from oil-water mixture which has been produced from a well. Salt water is introduced into a recirculating weir and mixed with more concentrated brine. Brine is recirculated through a thermal syphon apparatus. Recirculation includes passing brine, including some salt water, from weir into boiler vessel. Brine is heated within boiler vessel to a boiling temperature whereby brine, while boiling, generates steam which passes up out of weir. All of foregoing steps are performed at atmospheric pressure. The density of brine is sensed at a location in the lower vicinity of weir. Concentrated brine is released from lower vicinity when density at sensed temperature is at a level corresponding to a brine concentration near the precipitation of salt from solution. Salt water and brine is passed through a magnetic water treating unit. The concentrated brine, as released, is passed into a holding vessel.

20 Claims, 1 Drawing Sheet

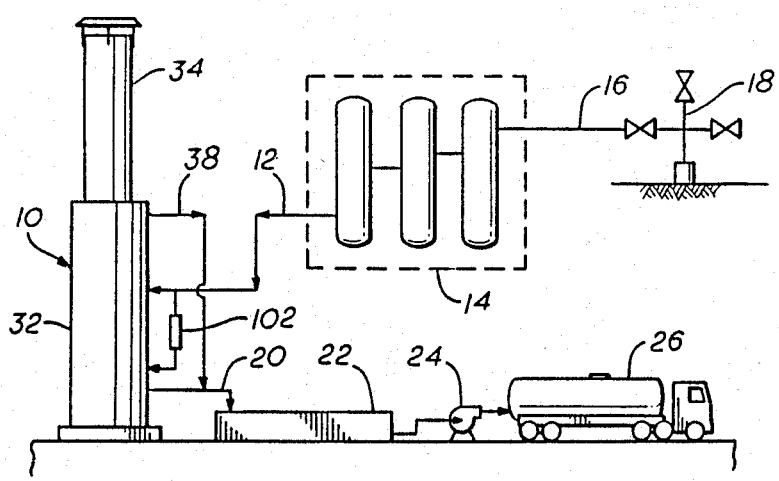
FIG. 1
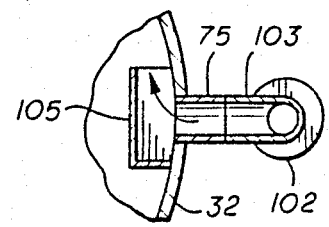
FIG. 3
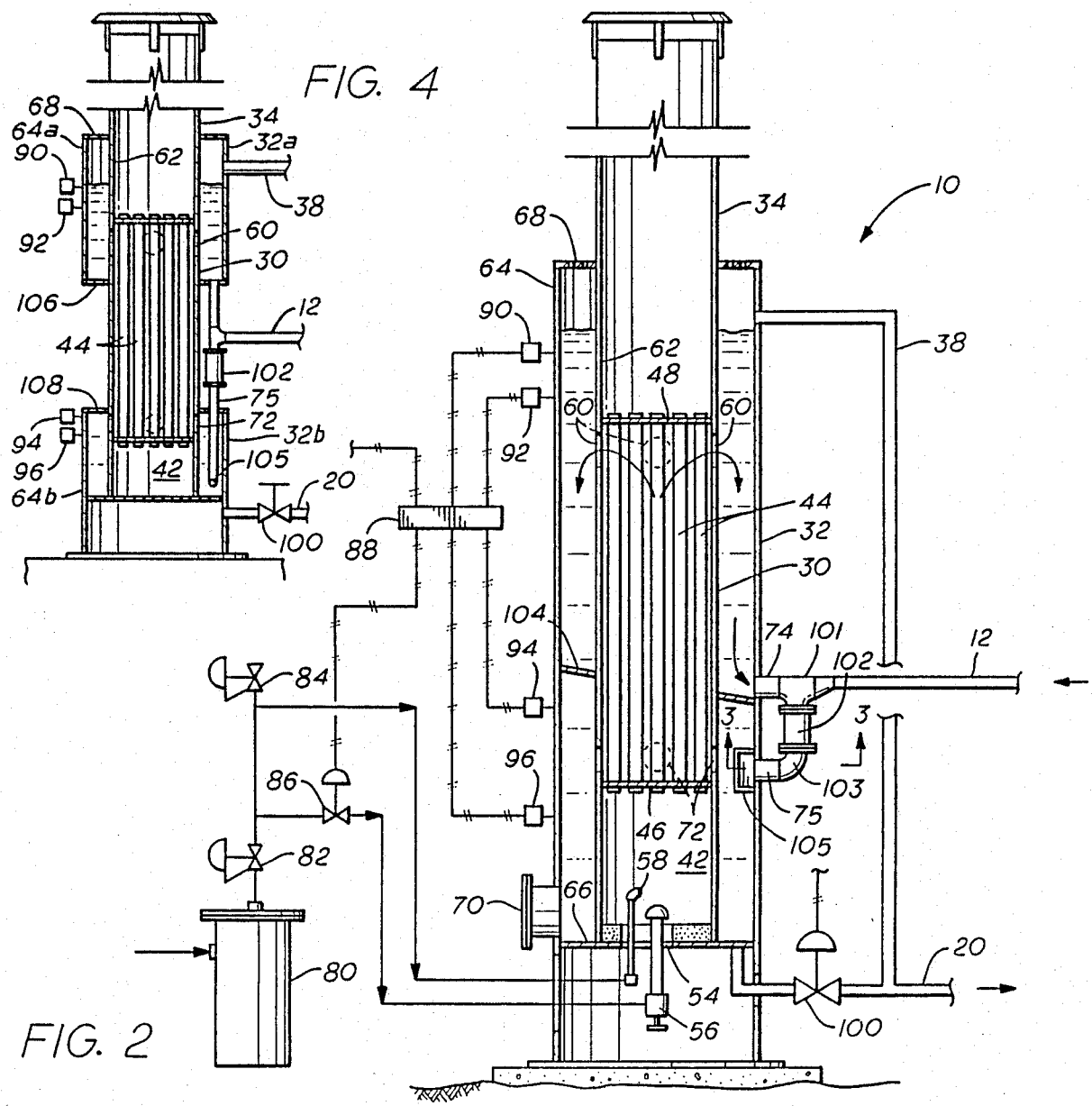
FIG. 4
FIG. 2

SELF-CONTAINED OIL WELL SALT WATER CONCENTRATION SYSTEM

FIELD OF THE INVENTION

This invention generally relates to the evaporation of liquid solutions to reduce the volume of the liquid while retaining the remaining constituents of the solution. More particularly, this invention pertains to reducing and concentrating salt water as produced with oil and gas from an oil well.

BACKGROUND OF THE INVENTION

Most oil wells produce a mixture of oil, salt water and gas. The produced ratio of salt water to oil varies greatly from well to well, for example, from 5% salt water with 95% oil to 95% salt water with 5% oil.

This salt water must be disposed of and in accordance with good conservation practices, defined in most states by statute, and by the United States Environmental Protection Agency on a national basis.

The salt water is sometimes transported from an oil well, or a group of wells, via a pipeline to a designated disposal site such as an injection well.

In areas where the oil wells are more dispersed, the salt water is collected by tank trucks from storage tanks, usually shallow fiberglass or metal "livestock" tanks and hauled to a disposal site.

Hauling the salt water involves the expenses of mileage and time for each barrel (42 gallons) of salt water.

If the produced salt water can be reduced and concentrated to a concentrated brine, for example, to 10% to 30% of its original volume, then the hauling expenses are reduced accordingly.

The present invention preferably utilizes natural gas for fuel to concentrate the salt water to brine. Some natural gas is usually produced along with the oil and the salt water in a typical well. Thus, on many locations, the fuel for the invention is available at no extra expense.

A prior art search made for the present invention uncovered U.S. Pat. Nos. 1,325,461 to Barbet, No. 4,002,538 to Pottharst, and No. 4,444,623 to Youngner. No more pertinent prior art is known.

OBJECTS OF THE INVENTION

The principal object of the present invention is to efficiently concentrate oil field salt water to brine and thereby to reduce the cost of disposal of the salt water.

Another object of the present invention is to provide simple, transportable and automatic apparatus for concentrating salt water into brine with negligible operating costs past amortization, usual maintenance and occasional scale removal in some instances.

SUMMARY OF THE INVENTION

The foregoing and other objects and advantages of the present invention are attained by a method of concentrating the produced salt water into brine. First, the water from the well head processing equipment is introduced into a thermal syphon recirculating boiler. Second, when the boiler has been filled to its maximum operating capacity, the boiler is fired automatically with natural gas produced from the well and the liquid inside the boiler is heated by the thermal syphoning action and is thereby recirculated through a recirculating weir or stand pipe tank and the tube portion of the boiler. As the water continues to heat, the amount of steam generated increases greatly and is allowed to vent into the atmosphere from the recirculating weir. Salt water from the well continues to flow into the boiler as the evaporation and recirculating process continues. Third, when the concentration of salt in the recirculating liquid reaches a pre-determined concentration level, it is then classed as a brine and dumped into the storage tank. Fourth, the boiler is refilled to capacity and the operation of the recirculating boiler is resumed. Brine is removed from the holding tank periodically by tanker truck.

If the flow of water from the well exceeds the capacity of the recirculating boiler, it overflows through a separate conduit into the holding tank.

The invention provides an integral and transportable recirculating boiler for concentrating the salt water produced by an oil well into a concentrated brine. The recirculating boiler includes a thermal syphon apparatus and a recirculating weir. The column of water is carried vertically inside the boiler portion of the thermal syphon by the decreasing specific density of the water as caused by the increasing heat and also caused by steam formation within the water as it rises. Liquid passage is provided between the top of the thermal syphon and the recirculating weir. Liquid passage is also provided at the bottom of the recirculating tank to allow the liquid to re-enter the thermal syphon in continuous fashion. The continuous circulation reduces the precipitation of solids by providing a homogeneous soluton with a nearly uniform change in temperature. The thermal syphon consists of a plurality of heating tubes vertically disposed within the vessel, a fire box in respective connection with the heating tubes and located near the bottom of the vessel, and venting apparatus in respective connection with the heating tubes at the upper end of the vessel and the recirculating tank or weir which is annular in form and extends concentrically about the boiler tank to complete the thermal syphon. All the liquid recirculating through the system is passed through a magnetic water treater apparatus.

A sensing device is located in the recirculating boiler and connected to a control device for releaseing the brine solution from the container at a predetermined level of concentration. When the sensing device commences draining of the boiler, salt water from the well head continues to flow into the boiler. The sensing device stops the heating apparatus while the concentrated brine is being released. After the boiler is drained to the desired low level, a sensing device stops the flow of the brine from boiler into the stock tank and the boiler and recirculating weir are refilled with salt water. Once the water level in the boiler reaches the desired level, the boiler is again automatically fired and the process is repeated.

If, during the operation of the boiler, the flow of water from the well head exceeds the evaporation capacity of the recirculating boiler, the excess water is diverted to the stock tank through an overflow conduit. Alternately, if the evaporation rate of the boiler exceeds the flow of the water into the boiler from the well head, then a low level control will shut off the boiler fire at a predetermined low level and the boiler will be again fired when the water level is increased to a desired level. This cycle may occur several times to reach a concentrated brine which is 10% of the relative volume of the initial salt water, for example.

BRIEF DESCRIPTION OF THE DRAWING

FIG. 1 is a schematic flow diagram illustrating the flow path of the salt water from a well head through a gas/oil/water separator, a brine concentration system, an open type holding tank or vessel, and ultimately a transport truck; and FIG. 2 is a schematic illustration of the brine concentration system of the present invention as disposed between the separator system and the holding vessel;

FIG. 3 is a detailed view taken along the line 3—3 of FIG. 2 and showing a baffle structure for diverting and dispersing the liquid entering into the vessel in that location; and FIG. 4 shows a structure which is alternate to the structure shown in FIG. 2.

DESCRIPTION OF THE PREFERRED EMBODIMENT

Referring now to the drawing, and first to FIG. 1, there is shown the brine concentrator apparatus 10 which receives the salt water from a salt water feed conduit 12 connected from a commercial gas/oil/water separator 14. The separator 14 receives a produced mixture through a product feed conduit 16 from the well head 18. The salt water received from the separator 14 is reduced to concentrated brine by the concentrator 10 which discharges the concentrated bring through a discharge condiut 20 into a holding vessel 22. The vessel 22 is a shallow tank of relatively large diameter and of the kind used in the cattle growing country as a "livestock" watering tank.

At intervals, the concentrated brine is loaded into a transport truck 26 or the like by means of a pump 24. In most instances, the pumping mechanism 24 is mounted as part of the truck 26 and may be a centrifugal pump. Sometimes, the truck may be equipped with a vacuum pump to suck the concentrated brine into the truck by vacuum.

The concentrator 10 is seen in FIG. 2 to incorporate a vertical boiler vessel 30, a recirculating weir or tank 32, and a venting exhaust stack 34.

It is to be noted that all of the concentrator 10, including the piping from the separator 14, is operated at atmospheric pressure. Thus, the strength of the boiler vessel 30, recirculating weir 32, and the associated piping may be governed more by the transporting, erection and wind loading for the concentrator assembly than for the pressure requirements for its operation. An overflow conduit 38 is connected between the recirculating weir at its maximum operating level and the conduit 20. Conduit 38 bypasses any produced salt water from separator 14, which is in excess of the maximum intake for the concentrator 10, over to the concentrated discharge conduit 20.

The components described in FIG. 1 carry the same numbers in FIG. 2. As shown in FIG. 2, the boiler vessel 30 contains a fire box 42 within its lower end connected to a plurality of heating tubes 44 which extend upwardly through the boiler vessel 30 for connection into the venting stack 34. The tubes 44 are connected at their lower end into a tube sheet 46 and at their upper end to a tube sheet 48 which closes the upper end of the boiler vessel 30.

The fire box 42 is formed with a port 54 on the bottom through which is mounted gas heating burner 56 and a pilot burner 58.

At the upper end of the boiler vessel 30, the vessel forms a plurality of side ports 60 extending around the upper circumference of the vessel. As seen, the recirculating weir 32 is annular in configuration with its inner wall being an extension of the outer wall of the boiler vessel 30. Thus, the recirculating weir has an inner wall 62, and outer wall 64, and an annular lower bulkhead 66 to form an annular vessel. The vessel recirculating weir 32 may also have a vented bulkhead 68 at its upper end to provide structural strength between the walls 62 and 64 and also to reduce splashing of the brine out over the top of the recirculating weir.

The ports 60 provide full communication of liquids between the boiler vessel 30 and the recirculating weir 32. Noted is an access port 70 located at the bottom of the boiler vessel 30 for the purpose of clean-out, inspection and the like. The lower portion of recirculating weir inner wall 62 is formed with a plurality of ports 72 which allow reintroduction of liquids in the boiler vessel 30 just above the tube sheet 46.

The pathway of liquid within the recirculating weir 32, lower ports 72, the interior of vessel 30, and the ports 60 back into the recirculating weir 32, constitutes a thermal syphon which circulates the liquid in concentrator 10 responsive to heat applied within the heating tubes 44 from the fire box 42.

As now seen, produced salt water is brought through conduit 12 which is connected into the inlet 101 of a magnetic water treater 102. The outlet of water treater 102 is connected through an outlet line 103 into a port 75 located in the lower side of weir 32. The inlet 101 is connected into a port 74, also located in the lower side of weir 32 just above the port 75.

Inside the annular weir 32 and located intermediate the ports 74 and 75 is located an annular bulkhead plate 104 which extends completely around the annular cavity of weir 32 and inclined slightly off the horizontal downwardly to the port 74. The purpose of the baffle 104 is to divert all fluid flow through weir 32 as caused by the syphoning action of weir 32 in connection with boiler 30 through the water treater 102. With conduit 12 connected into the inlet 101, all of the new salt water coming into the system first goes through the water treater 102 along with recirculation of liquid through the weir 32.

FIG. 4 shows a similar but alternate structure to the structure 10 of FIG. 2. Though FIG. 4 is approximately one-half the size of FIG. 2, the actual structures are to be the same size. Like parts of FIG. 4 and FIG. 2 bear the same numbers.

The difference is that the shell or outer wall 64 of weir 32 has its center section removed to leave an upper wall 64a closed at its lower end by a bulkhead 106 to form an upper weir portion 32a of weir 32 and a lower outer wall 64b closed at its upper end by a bulkhead 108 to form a lower weir portion 32b. As shown, the wall 62 of boiler 30 and stack 34 complete the portions 32a and 32b.

The conduit 74 (about 3" size), the "T" connector 101, the water treater unit 102 and the conduit 75 complete a communication passage between the upper and lower weir portions 32a and 32b and consequently the thermal syphon as previously described. The alternate embodiment of FIG. 4 is considered to offer less fabrication cost and better elimination of any quiescent or inert zones in the recirculation system.

In FIG. 4 the conduit 75 extends to near the bottom of lower weir portion 32b and the baffle 105 is in the form of an "Ell" such as connector 103.

To minimize scale deposition and precipitation of cyrstalline salt from solution, the magnetic water treater 102 is a significant and important component of the system. The magnetic water treater 102 is commercially available under the description of magnetic hydrodynamic or "MHD" units which depend on passing the water through an orthogonally disposed magnetic field at a velocity in excess of 20 FPS.

A commercial device which may be used in the present invention can be a Model 12-P Hydro-Unit (in 4" diameter size) as manufactured by Hydrodynamics Corporation, 80 First Street, Gretna, La. 70053.

For further information on such devices, reference may be had to the manufacturer, or to American Petroleum Institute, Publication 960, *Evaluation of Principals of Magnetic Water Treatment*, 1st Ed., 1985.

As seen in FIGS. 2 and 3, liquids coming into weir 32 through port 75 from water treater 102 is diverted by a baffle 105 to be swirled around the inside of weir 32 to be more evenly distributed for entry through the ports 72 into boiler 30. The swirling action is also helpful in exposing sensors 94 and 96 to more characteristic brine samples.

Natural gas, as may be extracted by separator 14, is utilized to both heat and control the concentrator 10 (the natural gas is used in lieu of compressed air in the control system). The gas is brought into a scrubber 80 which principal purpose is to remove water from the gas and to filter out particulates as may be remaining in the gas.

The scrubber 80 and burner 56 assembly may be conventional as for a packaged boiler. For simplicity the various safeguard and auxillary controls are not shown or described herein in detail.

A conventional pressure regulator 82 controls the discharge pressure from the scrubber 80 and a conventional pressure relief valve 84 is also used. The output from the regulator valve 82 passes to a heater control valve 86 which controls the heater burner 56 in an "off/on" action rather than a throttling action. The pilot burner 58 burns continuously to light the heater burner 56 when the control valve 86 is opened.

The control valve 86 is controlled in its off/on fashion by heater valve controller 88. The valve controller 88 operates to control the valve 86 in response to different signals including signals from safety devices not herein shown in connection with the heater package.

Recirculating weir 32 is provided with an upper liquid level sensor 90, a lower liquid level sensor 92, a temperature density sensor 94, and a low level sensor 96. As shown, the sensors 90, 92, 94 and 96 have signal outputs connected into the valve controller 88. Level sensor 96 has its signal output connected into controller 88 and additionally through controller 88 into a concentrated brine dump control valve 100, as shown. Dump valve 100 is connected between the thermal syphon drain 72 and the brine outlet conduit 20 for passage of concentrated brine from the recirculating weir 32 to the holding vessel 22.

The valve 100 dumps concentrated brine from the concentrator 10 into the tank 22 as initiated by the density sensor 94. The density sensor is set immediately below the expected level of density which corresponds to precipitation of salt from solution at a designated temperature. Of course this density sensor may be set at some other level to produce concentrated brine of different concentrations.

The gas used to actuate the sensors 90, 92, 94 and 96 and the controller 88 is gas supplied through the gas scrubber 80 through piping (not shown) rather than conventional instrument air which would not be available on remote sites such as where the present invention is used.

The burner valve 86 and corresponding heat produced by the heater burner 56 is turned on and off by combinations of one or more signals from the sensors 90, 92 and 94 as follows.

Assume that produced salt water is continually flowing into the recirculating weir 32 from conduit 12. The heater burner 56 is operating to pass very hot gas through the heating tubes 44. The salt water surrounding the heating tubes 44 is heated to boiling temperature. Salt water and steam, with substantially reduced density, rises up through the boiler vessel to exit through upper ports 60 into the recirculating weir 32. The steam vents to atmosphere through vented bulkhead 68. The remaining brine, which has greater density, moves downward into the lower portion of the recirculating weir 32, is guided through the magnetic water treater 102 by baffle bulkhead 104, and through lower ports 72 into the boiler vessel 30 just above the tube sheet 46. The brine coming through ports 72 replaces the brine passing out through upper ports 60.

The difference in specific density of the liquid in the boiler vessel 30 and in the surrounding circulating weir 32 causes a static head differential between each which is the force which drives the recirculating flow through this thermal syphon provided in the concentrator 10.

During the time that the heater burner 56 is burning, the thermal syphon created by the temperature differential continually recirculates the brine. A portion of the liquids in the brine is boiled off continually as the recirculation continues. The salt water from conduit 12 makes up the liquid lost to steam vapor. The liquid level in weir 32 is subject to the flow rate of the salt water coming in through conduit 12. The level of concentrated brine is reduced in the concentrator system by dump valve 100.

The concentrator 10 is at rest with the heater turned off until enough additional salt water is brought into the system to trip the high level sensor 90 in the weir 32.

When the density of the brine located at density sensor 94 reaches its prescribed setting, the dump valve 100 is actuated to dump brine from the concentrator 10 until such time as the dump level limit sensor 96 is actuated by the liquid level within the weir 32, or density sensor 94 senses a density below its prescribed setting. Whichever of these events occurs first will shut off the dump valve 100. When the dump valve 100 is closed and the liquid level in weir 32 increase to be above the level sensor 90, the heater valve 86 is free to open.

If, however, the low level sensor indicator 92 indicates a liquid level at or below its location in weir 32, its signal will prevent the valve 86 from actuating the burner 56 until such time as brine has accumulated within the weir 32 up to or above the level indicator 90. At this time, the liquid level sensor 90 produces a signal which will permit the controller 88 to open valve 86 and start a heating cycle.

In the normal course of a complete cycle of concentrator 10, the liquid level in weir 32 reaches level sensor 90 with the density detected at sensor 94 being below that required to actuate dumping valve 100. The control valve 86 is thereon opened with heater burner 56 started. Heating of the tubes 44 and recirculation through the thermal syphon begins and is sustained with steam vapor from the boiling action in boiler vessel 30 escaping out through the ports 60 and out of the top 68 of the weir 32.

The concentration of the brine increases as the heating and recirculation continues.

During normal operation, a point may be reached where the liquid in weir 32 drops to the level detected by the low liquid sensor 92. The sensor 92 thereon sends a signal to the controller 88 to close off valve 86 and thereby discontinue the heating of tubes 44 until the level within weir 32 rises enough with salt water from conduit 12 to actuate the high liquid level sensor 90. The signal from the level sensor 90 thereon actuates controller 88 to open valve 86 and heating is resumed until the level in weir 32 again drops to the level of sensor 92, or the density sensor is actuated, whichever comes first. At such time as the concentration of brine within the concentrator 10 becomes sufficiently great to actuate the density sensor 94, then the sensor 94 actuates controller 88 to close valve 86 until such time as liquid sensor 90 is actuated.

In the event that the flow of brine into the recirculating weir 32 exceeds the combined dumping of concentrated brine, and the evaporation of the concentrated brine as steam vapor, then the level of brine within the weir 32 will rise up past the level sensor 90. At such time as the liquid level within the weir 32 rises past the height of the overflow conduit 38, then the excess liquid will bypass through the conduit 38, into the conduit 20 and on to the tank 22.

In review, the method of concentrating the produced salt water, as herein disclosed, includes the steps of separating the salt water through a separator 14 from an oil/gas/salt water mixture when has been produced from a well 18. The salt water is introduced into a recirculating weir or stand pipe 32 to be mixed with concentrated brine which is being recirculated through a thermal syphon arrangement including ports 72, boiler vessel 30, ports 60 and circulating weir 32.

The concentrated brine is heated within the vessel 30 to a boiling temperature, releasing steam vapor, and the vapor is released to atmosphere. The temperature of the concentrated brine is sensed at the lower vicinity of the weir 32 by a density sensor 94. Concentrated brine is released through conduit 20 when the density sensed is at a level corresponding to a brine concentration near the precipitation point of salt from solution.

Also in review, all salt water and recirculated fluids pass through a water treater 102. A thermal syphon arrangement incorporates the vertical boiler vessel 30 connected with and below the container 32 and includes port 72, vessel 30 and port 60 which pass concentrated brine from vessel 30 past density sensor 94. The apparatus includes a plurality of heating tubes 44 disposed vertically within the vessel, a fire box 42 in respective connection with the heating tubes and located in the lower vicinity of vessel 30 and a venting stack 34 in respective connection with the heating tubes.

The sensor 94 is connected to a controller 88 which actuates the valve 100 to release concentrated brine from the weir 32 at a density approaching the precipitation point of salt from solution. The dump valve is closed upon actuation of low level sensor 96. The control 88 is responsive to sensors 90, 92 and 94 to actuate the valve 86 to heat the vessel 30 when the concentrated brine is not being released and to stop the heating of the vessel 30 when concentrated brine is being released or when sensor 92 detects the lower operating level.

Of note, it is to be understood that the embodiment herein illustrated and described may be modified and revised to a considerable extent with such modifications and revisions all coming within the purview and scope of the appended claims.

What is claimed is:

1. Apparatus for concentrating salt water into a concentrated brine, comprising:
   (a) a boiler vessel including a plurality of heater fire tubes vertically disposed through said boiler vessel from a fire box located at the lower ends of said tubes to a vent located at the upper ends of said tubes;
   (b) said boiler vessel including upper passage means at its upper end and lower passage means at its lower end;
   (c) weir means including an upper weir and a lower weir;
   (d) conduit means connected in liquid communication with said upper passage means through said upper weir and with said lower passage means through said lower weir;
   (e) said upper weir, said conduit means, said lower weir and said boiler vessel comprising a thermal syphon means arranged to recirculate said brine upwardly through said boiler vessel and downwardly through said conduit means responsive to heat applied in said firebox;
   (f) said syphon means having an inlet for receiving salt water into said syphon means and mixing said salt water with brine contained within said apparatus;
   (g) a magnetic water treater connected into said syphon means to magnetically treat the brine being recirculated through said syphon means; and
   (h) sensing means connected to sense the brine in said lower weir and connected to actuate a control means when the density of said brine approaches a designated density occurring of a designated temperature; said control means being connected to open a valve connected with said lower weir and thereby release the concentrated brine from said lower weir in response to actuation by said sensing means.

2. The apparatus of claim 1 further including heater control means connected to said control means and operatively associated with said fire box to cause heating of said brine when said brine is not being released and to prevent heating of said brine when said brine is being released.

3. The apparatus of claim 2 further including oil/water separator means connected to said inlet to supply said salt water into said inlet.

4. The apparatus in claim 2 wherein said fire box further includes a gas burner connected to said heater control means.

5. The apparatus of claim 1 further including means connected with said upper weir to divert from said apparatus any salt water received in excess of that needed to be mixed with said brine.

6. The apparatus of claim 1 further including a holding container connected and disposed to receive said concentrated brine.

7. The apparatus of claim 1 wherein said sensing means further includes a low liquid level sensing means connected to said lower weir to actuate said control means to close said valve.

8. The apparatus of claim 1 wherein said magnetic water treater is connected to said syphon means to treat said salt water entering said syphon means.

9. The apparatus of claim 8 wherein said magnetic water treater is connected to said syphon means to treat all of the liquid being recirculated through said syphon means including said salt water.

10. The apparatus of claim 1 wherein said sensing means further includes a low liquid level sensing means connected to said lower weir to actuate said control means to close said valve and wherein said apparatus further includes heater control means connected to said control means and operatuvely associated with said fire box to cause heating of said brine when said brine is not being released and to prevent heating of said brine when said brine is being released.

11. Apparatus for concentrating salt water into a concentrated brine, comprising:
 (a) a boiler vessel including a plurality of heater fire tubes vertically disposed through said boiler vessel from a fire box located at the lower ends of said tubes to a vent located at the upper ends of said tubes;
 (b) said boiler vessel including upper passage means at its upper end and lower passage means at its lower end;
 (c) weir means including an upper weir and a lower weir;
 (d) conduit means being in liquid communication with said upper passage means through said upper weir and with said lower passage means through said lower weir;
 (e) said upper weir, said conduit means, said lower weir and said boiler vessel comprising a thermal syphon means arranged to recirculate said brine upwardly through said boiler vessel and downwardly through said conduit means responsive to heat applied in said fire box;
 (f) said syphon means having an inlet for receiving salt water into said syphon means and mixing said salt water with brine contained within said apparatus; and
 (g) sensing means connected to sense the brine in said lower weir and connected to actuate a control means with the density of said brine approaches a designated density occurring at a designated temperature; said control means being connected to open a valve connected to said lower weir and thereby release the concentrated brine from said lower weir in response to actuation by said sensing means.

12. The apparatus of claim 11 ffurther including a magnetic water treater connected into said syphon means to treat liquid being recirculated through said concuit means.

13. The apparatus of claim 11 further including heater control means connected to said control means and operatively associated with said fire box to cause heating of said brine when said brine is not being released and to prevent heating of said brine when said brine is being released.

14. The apparatus of claim 13 wherein said fire box further includes a gas burner connected into said heater control means.

15. The apparatus of claim 11 wherein said sensing means includes a low liquid level sensing means connected to said lower weir to actuate said control means to close said valve.

16. The apparatus of claim 11 wherein a magnetic water treater is connected into said syphon means to treat said salt water entering said syphon means.

17. The apparatus of claim 16 wherein said magnetic water treater is connected into said syphon means to treat all the liquid being recirculated through said syphon means including said salt water.

18. The apparatus of claim 12 wherein said sensing means further includes a low liquid level sensing means connected to said control means to actuate said control means to close said valve, and wherein the said apparatus further includes heater control means connected to said control means and operatively associated with said fire box to cause heating of said brine when said brine is not being released and to prevent heating of said brine when said brine is being released.

19. The apparatus of claim 11 further including (a) a magnetic water treater connected into said conduit means to treat liquid being recirculated through said conduit means; and (b) heater control means connected to said control means and operatively associated with said fire box to cause heating of said brine when said brine is not being released and to prevent heating of said brine when said brine is being released.

20. The apparatus of claim 11 further including (a) a magnetic water treater connected into said conduit means to treat liquid being recirculated through said conduit means; and (b) heater control means connected to said control means and operatively associated with said fire box to cause heating of said brine when said brine is not being released and to prevent heating of said brine when said brine is being released; and (c) wherein said sensing means further includes a low liquid level sensing means connected to said lower weir to actuate said control means to close said valve.

* * * * *